US006952692B1

United States Patent
Bhattiprolu et al.

(10) Patent No.: US 6,952,692 B1
(45) Date of Patent: Oct. 4, 2005

(54) EXECUTION OF REQUESTS IN A PARALLEL DATABASE SYSTEM

(75) Inventors: Phaneendra Bhattiprolu, El Segundo, CA (US); Grace K. Au, Rancho Palos Verdes, CA (US)

(73) Assignee: NCR Corporation, Dayton, OH (US)

( * ) Notice: Subject to any disclaimer, the term of this patent is extended or adjusted under 35 U.S.C. 154(b) by 488 days.

(21) Appl. No.: 10/150,198

(22) Filed: May 17, 2002

(51) Int. Cl.[7] ............................................. G06F 17/30
(52) U.S. Cl. ............................................. 707/3; 707/4
(58) Field of Search ............................... 707/1, 2, 3, 10, 707/100, 102, 104.1; 703/21, 22

(56) References Cited

U.S. PATENT DOCUMENTS 5,978,576 A * 11/1999 Sanadidi et al. ............. 703/22
6,081,801 A * 6/2000 Cochrane et al. ............. 707/3
6,738,756 B1 * 5/2004 Brown et al. ................. 707/2
6,801,903 B2 * 10/2004 Brown et al. ................. 707/2

OTHER PUBLICATIONS

Oracle 8i documentation, 1999, pp. 1-31.*

* cited by examiner

Primary Examiner—Apu M. Mofiz
(74) Attorney, Agent, or Firm—Trop, Pruner & Hu, P.C.; Harden E. Stevens, III

(57) ABSTRACT

A database system is able to perform efficient execution of insert-select, join-delete, or join-update requests. The database system has plural access modules to manage access of respective portions of data in a storage of the database system. If certain predefined criteria are satisfied, the insert-select, join-delete, or join-update request can be executed by performing a single-access module merge and/or merge-delete step on a single one of the access modules with row-level locks (e.g., row-hash locks).

20 Claims, 4 Drawing Sheets

EXECUTION OF REQUESTS IN A PARALLEL DATABASE SYSTEM

BACKGROUND

A database is a collection of stored data that is logically related and that is accessible by one or more users. A popular type of database system is the relational database management system (RDBMS), which includes relational tables made up of rows and columns. Each row represents an occurrence of an entity defined by a table, with an entity being a person, place, or thing about which the table contains information.

To extract data from, or to update, a relational table, queries according to a standard database query language (e.g., Structured Query Language or SQL) are used. Examples of SQL statements include INSERT, SELECT, UPDATE, and DELETE.

Many database applications involve the storage of large amounts of data. For improved performance in the storage and processing of such large amounts of data, parallel database systems are used, such as TERADATA® database systems from NCR Corporation. A feature of such parallel database systems is the presence of multiple access modules or data server modules that manage access to data stored in respective portions of a storage system. Data access or manipulation operations can be performed concurrently in the multiple access modules to increase throughput.

Various different types of database operations can be specified by queries submitted to the database system. For example, queries can specify insert-select operations, join-delete operations, and join-update operations. Each of such operations involves a merge step (merging data from one table to another table), a merge-delete step (deleting rows of a target table based on a specified merge condition), or a combination of the two steps. Triggers and join index maintenance requests can also cause performance of insert-select operations, join-delete operations, and join-update operations.

In some versions of TERADATA® database systems, the merge and merge-delete steps associated with insert-select, join-delete, or join-update operations by default are executed on all access modules in the database system. Because of execution on multiple access modules, table-level locks are placed on target tables. If a table-level write lock is placed on a table, subsequent access or modification of the table is blocked. In a parallel environment, a table-level lock reduces the availability of parallel execution of steps specified by queries, triggers, join index maintenance requests, and other database requests.

SUMMARY

In general, according to one embodiment, an efficient method and apparatus is provided to execute requests in a database system. For example, a method is provided for use in a database system having plural access modules to manage concurrent access of data in respective portions of a storage in the database system. The method includes processing a request invoking an operation that is one of an insert-select operation, join-delete operation, and join-update operation, and determining if one or more predefined criteria associated with the operation are satisfied. In response to determining that the one or more predefined criteria are satisfied, a step to modify a target table is executed on a single one of the access modules.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
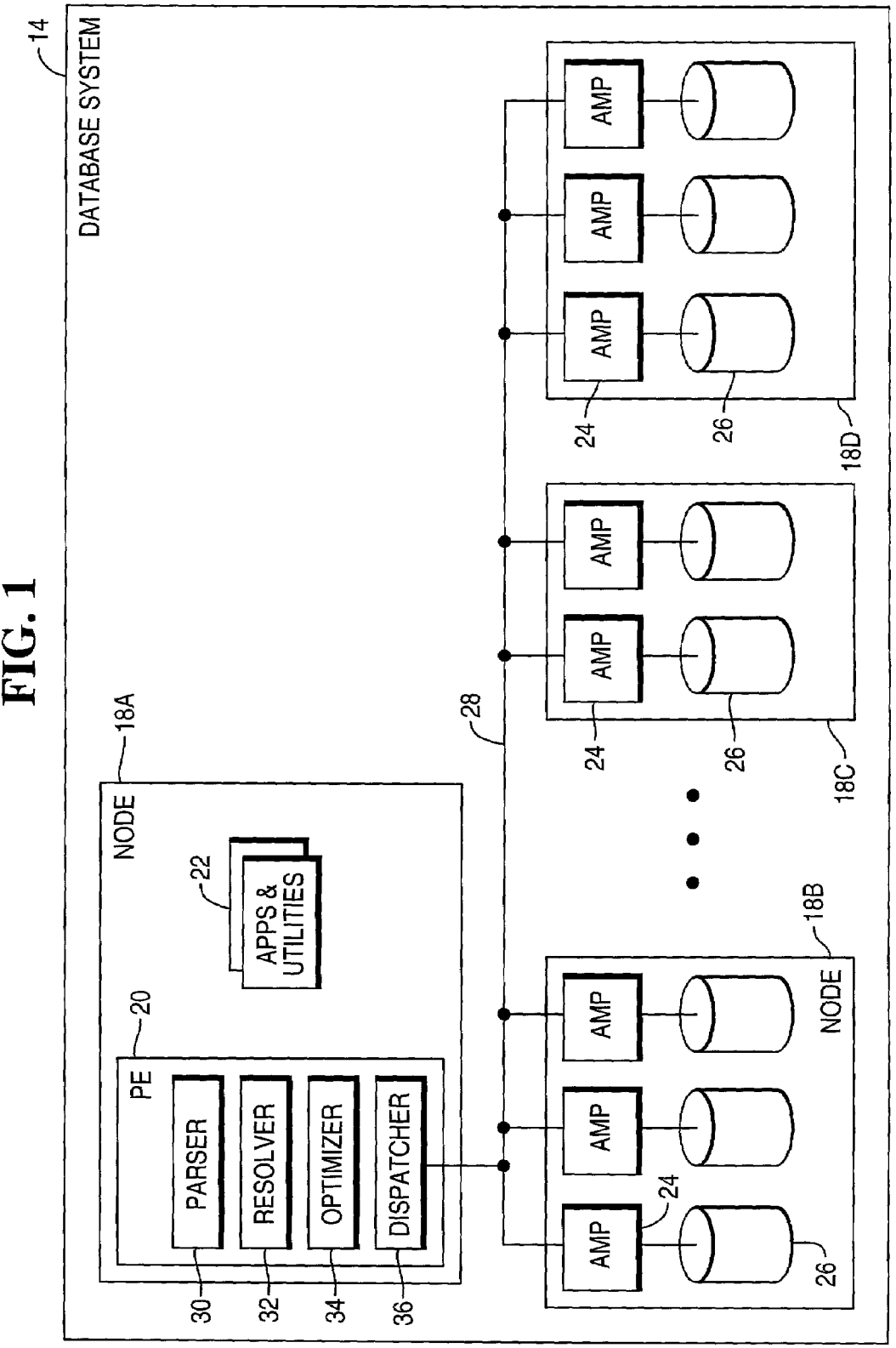
FIG. 1 is a block diagram of an example arrangement of a parallel database system.

In FIG. 1, an example arrangement of a database system 14 is shown. To access or manipulate data (e.g., relational tables, rows, and so forth) stored in the database system 14, queries according to a standard database query language are submitted to the database system 14. One example of a standard database query language is the Structured Query Language (SQL), provided by the American National Standards Institute (ANSI). One version of SQL is the SQL-92 Standard, while another version is the SQL-99 Standard. In other embodiments, other versions of SQL or other standard database query languages can be used.

The database system 14 includes several nodes 18A, 18B, 18C, and 18D, with each node 18 including database management components. The node 18A includes a parsing engine (PE) 20, as well as various applications and utilities 22. The parsing engine 20 includes a parser 30, a resolver 32, an optimizer 34, and a dispatcher (or scheduler) 36. In response to a request, the parser 30 checks the request for proper syntax. The request can be in the form of an SQL query, a trigger, join index maintenance requests, or any other type of database request that causes submission of queries for data access or updates. The resolver 32 semantically evaluates the request. The resolver 32 also accesses a data dictionary to check that objects referred to in the request exist and that the user issuing the request has authority to access the objects. The optimizer 34 develops an execution plan that is the least expensive plan for the given request. The execution plan includes a series of steps that are to be performed in response to the request. The optimizer 34 considers several possible plans and selects the plan with the lowest cost (in terms of execution time and database system resource usage).

The dispatcher (or scheduler) 36 controls (or schedules) the sequence in which the steps are executed. The steps are communicated over an interconnect layer 28 to access modules (or data server modules) 24 for accessing data stored in the database system 14. In the example embodiment of FIG. 1, access modules (or data server modules) include access module processors (AMPs) 24 each coupled to a respective storage module 26. In one example embodiment, the AMPs 24 are based on AMPs used in TERADATA® database systems from NCR Corporation.

The arrangement of the database system 14 shown in FIG. 1 is a parallel database arrangement, in which the multiple AMPs 24 are capable of concurrently accessing data in respective storage modules 26. Each AMP 24 is a software module that is responsible for managing a respective portion of the storage system made up of the storage modules 26. The AMPs 24 respond to steps received from the parsing engine 20 by selecting data from or storing data to respective storage modules 26. A "step" from the parsing engine 20 generally refers to a command or other indication provided to the AMPs 20 to perform selected data access or manipulation actions.

The AMPs 24 are responsible for locking databases, tables, or portions of tables; creating, modifying, or deleting definitions of tables; inserting, deleting, or modifying rows within tables; and retrieving information from definitions and tables. The AMPs, after executing an action specified by the parsing engine 20, return responses to the parsing engine 20 over the interconnect layer 28.

Note that although only one parsing engine 20 is shown in FIG. 1, the database system 14 can actually include multiple parsing engines. The parsing engines can reside on any or all of the nodes 18A, 18B, 18C, and 18D.

Certain types of requests involve the merging of data from one table (the "source" table) to another table (the "target" table). This merging of data is performed in a merge step. Other requests involve a merge-delete step, which deletes rows of the target table based on satisfying a merge condition that matches attributes of the target table with a source table. Examples of requests that invoke a merge step and/or a merge-delete step are SQL queries that specify an insert-select operation, a join-delete operation, or a join-update operation. Triggers initiated by a triggering query can also invoke insert-select, join-delete, or join-update operations. Similarly, join index maintenance requests can also invoke insert-select, join-delete, or join-update operations. In summary, embodiments of the invention are applicable to any request made in a database system that invokes any one of an insert-select, join-delete, or join-update operation.

Generally, a "trigger" refers to a structure that specifies an action to take in response to a triggering event that modifies data in one or more tables in the database system 14. Examples of a triggering event (specified by an SQL query) include an insert event (in which a row is inserted into a table), a delete event (in which a row is deleted from a table), and an update event (in which the content of a table is updated). The action specified in an action body of the trigger is in the form of one or more SQL queries. The triggering event in combination with the action specified in the trigger action body is usually resolved to a multi-statement request by the parsing engine 20. In some cases, the multi-statement request can specify one of an insert-select operation, join-delete operation, and join-update operation.

A join index is an index kept for a materialized view that stores the join result of multiple base relations. As the materialized view is updated (due to updates of base relations of the materialized view), maintenance of the join index is also needed.

In accordance with some embodiments of the invention, in response to a database request that specifies one of an insert-select, join-delete, or join-update operation, the resultant merge and/or merge-delete steps are executed as single-AMP steps (instead of all-AMP steps) if one or more predefined criteria are determined to be satisfied. By executing the operations as single-AMP operations, parallelism in the parallel database system 14 can be enhanced. The single-AMP merge and merge-delete steps are performed with row-hash locks placed on rows that are being modified, instead of table-level locks. A table-level lock prevents access or update of the entire table across all AMPs in the database system while the table-level lock remains active. If a table-level write lock is placed on a table, then any subsequent read or write transaction on the table is blocked. In contrast, a row-hash lock applies only to rows of the table having the same row hash. A row-hash lock placed in one AMP does not affect access of table rows of different row hash in the same AMP or in another AMP. A row-hash lock is a type of row-level lock. Although some embodiments described here employ row-hash locks, other embodiments can employ other types of row-level locks.

Figure 2:
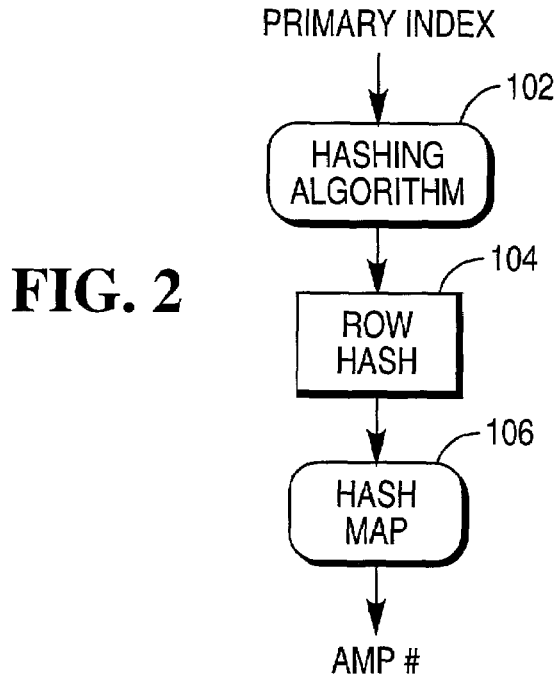
FIG. 2 illustrates selecting one of plural access modules in the database system based on a primary index value.

A row hash is generated from the primary index value of a given row. In one embodiment, rows of a table are assigned primary index values to determine their distribution across the multiple AMPs of the database system 14. In most cases, one or more of the columns of a table are assigned to be the primary index. Selection of an AMP to store a row of a table based on its primary index value is illustrated in FIG. 2. The primary index value of a row goes into a hashing algorithm 102, which produces a row hash 104. The row hash 104 selects an entry of a hash map 106, with the entry containing a number that corresponds to a specific one of the AMPs. The corresponding row is stored in the selected AMP. A row-hash lock placed on rows of a table locks all rows of a table that have the same row hash value. The rows having the same row hash value will be on the same AMP.

Generally, the criterion to determine if a merge step of an insert-select operation is executable as a single-AMP merge step is as follows. An INSERT-SELECT query, e.g., INSERT Tx SELECT a, b, c, d FROM Ty WHERE <condition>, has a SELECT list (which lists the attributes of the row to be inserted into the target table) and a WHERE clause (that specifies the condition under which attributes of some table Ty are to be inserted into target table Tx). For a column, c, that is a primary index column of the target table, check the corresponding position in the SELECT list of the INSERT-SELECT query. A single-AMP merge step is possible if one of the following two conditions is met:

(1) if the SELECT list specifies a value (constant number) or a value expression (an expression that evaluates to a constant number), referred to as "val," in the position of column c; and (2) if the SELECT list specifies an expression, col_expr (e.g., a+2, a, etc.), involving attributes of the source table in the position of column c, and the WHERE clause contains an equality condition "$s_i$=$val_i$," for each $s_i$ that is a source table attribute involved in col_expr.

In the ensuing discussion, this is referred to as the "insert-select single-AMP criterion." If either condition (1) or (2) is true, then a value assignment "c=val" can be derived, where val is (or can be calculated to) a constant number. Since the primary index value of the target table is known (c=val), the merge step is performed as a single-AMP merge on the AMP selected based on the known primary index value.

In the discussion that follows, various examples are provided to help in the understanding of some embodiments of the invention. However, such examples are not intended to limit the scope of the inventions as defined by the claims.

In one example, data definitions for tables T1, T2, and T3 are as follows:

T1(A1 INT, B1 INT, C1 INT, . . . ) PRIMARY INDEX (A1);

T2(A2 INT, B2 INT, C2 INT, . . . ) PRIMARY INDEX (A2, B2);

T3(A3 INT, B3 INT, C3 INT, . . . ) PRIMARY INDEX (A3);

In the data definitions, table T1 is defined to have attributes A1, B1, C1, and so forth, with the primary index being attribute A1. Similarly, table T2 is defined to have attributes A2, B2, C2, and so forth, with the primary index including attributes A2, B2. Table T3 is defined to have attributes A3, B3, C3, and so forth, with the primary index being A3.

An example INSERT-SELECT query that satisfies condition (1) of the insert-select single-AMP criterion is provided below:

INSERT T1 SELECT 45, A2, C2 FROM T2 WHERE C2>0;

The primary index of target table T1 is A1, which is set equal to the constant value 45 in the SELECT list. Therefore, A1 is set equal to 45 (A1=45) in each row inserted into the target table T1.

An example INSERT-SELECT query that satisfies condition (2) above is provided below:

INSERT T1 SELECT B2−10, A2, C3 FROM T2, T3 WHERE A2=A3 AND B2=100;

The position of the primary index (A1) of the target table T1 in the SELECT list has the expression B2−10(an expression that involves an attribute B2 of the source table). Thus, according to condition (2) above, col_expr=B2−10. In the WHERE clause, the attribute B2 of a source table T2 is equated to the constant value 100 (B2= 100). Thus the primary index (A1) value of each row inserted into the target table is B2−10=90.

An example INSERT-SELECT query that satisfies both conditions (1) and (2) above is provided below:

INSERT T2 SELECT 45, B3, C3 FROM T3 WHERE B3=100;

The primary index columns of target table T2 are A2, B2. The value of the first primary index column A2 is equal to 45, as specified in the SELECT list, and the value of the second primary index column B2 is set by the expression B3 (involving an attribute B3 of the source table T3) in the SELECT list, where B3 is set equal to 100 in the WHERE clause.

Another example SQL query that satisfies condition (2) above is provided below:

INSERT T3 SELECT * FROM T1 WHERE A1=10;

In the insert-select operation specified by this example query, rows of table T1 (the source table) that satisfy the search condition in the WHERE clause of the SELECT statement are inserted into table T3 (the target table). Note that the insert-select operation causes the primary index (A3) of target table T3 to be assigned to a known value (e.g., 10) through A1, which is an attribute of the source table T1.

In performing the insert-select operations for the example queries above, a spool to collect the rows the target of table satisfying the search condition of the WHERE clause is built locally on a single AMP, with the AMP selected based on the known primary index value of the target table. The merge step to merge the content of the spool into the target table also occurs on the same AMP. As a result, row-hash locks can be placed instead of a table-level lock on rows of the target table.

Note that in the last example referred to above, the primary index A3 of the target table is assigned to the primary index A1 of the source table, with the WHERE clause specifying an explicit value for A1. As a result, all rows of both the source table and target table that are involved in the merge-step are located on the same AMP.

However, the rows of the source table involved in the insert-select operation do not need to be located on the same AMP as the rows of the target table. In fact, in the examples preceding the last example query above, the source table rows may be located on other AMPs. Such rows are copied from the other AMP(s) to the AMP on which the spool is built and the single-AMP merge step is performed.

Generally, a merge-delete step of a join-delete operation is executable as a single-AMP merge-delete step if for each column, c, that is primary index column of the target table, a conjuncted equality condition of the form c=val, where val is a constant value or a value expression that can be resolved to a constant value, is found in the WHERE clause of the join-delete query. This is referred to as the "join-delete single-AMP criterion." A conjuncted equality condition refers to a condition in which table attributes are set to other values in one or plural expressions. For example, a=b and b=1 is a conjuncted equality condition where a is indirectly equated to the constant value "1." As another example, a=1 is a conjuncted equality condition in which the value of a is equated directly to the constant value "1."

An example join-delete query that satisfies the criterion above is as follows:

DELETE T1 FROM T2 WHERE T1.A1=T2.B2 AND T2.B2=1;

In this example, the primary index column A1 of the target table is set equal to the value 1 through the following conjuncted equality condition: T1.A1=T2.B2 AND T2.B2= 1. As a result, the merge-delete operation can be performed on a single AMP, the AMP selected by the primary index (A1) value 1.

In the join-delete operation, the merge-delete step deletes rows of the target table if the merge condition matching attributes of the source and target tables are satisfied.

Another example query specifying a join-delete operation is provided below:

DELETE T1 WHERE T1.A1=T3.A3 AND T3.A3=5;

In the specified join-delete operation, a merge-delete step is performed on a single AMP, since the WHERE clause contains an equality condition that assigns a constant value to the primary index (A1) of the target table.

In the first example join-delete query above, rows of the source table and the target table rows that are compared in the merge condition may be located on multiple AMPs. However, the merge-delete step is performed on a single AMP.

In the second join-delete query above, rows of the source table and rows of the target table involved in the join-delete operation are located on the same AMP (the AMP on which the merge-delete step is performed). That is because the source table primary index is equal to the target table primary index and the join condition specified in the WHERE clause is the equality condition between the two primary indexes with an explicit value specified for the primary index of either the source table or target table.

Another type of operation that can be performed is a join-update operation, which involves the execution of both a merge-delete step and a merge step. The criterion to determine if the merge-delete step and merge step can be performed as a single-AMP steps is the same criterion for the join-delete operation in determining whether the merge-delete step can be a single-AMP step. Generally, for each column, c, that is primary index column of the target table, a single-AMP merge-delete step and merge step can be performed if the WHERE clause of the join-update query contains a conjuncted equality condition of the form c=val, where val is a value or a value expression. This is also referred to as the join-delete single-AMP criterion.

An example join-update query is provided as follows:
  UPDATE T3 SET B3=T1.B1+1 WHERE T3.A3=T1.A1 AND T1.A1=6;

The UPDATE query specifies a join-update operation, in which rows of the target table T3 are updated based on the value of source table T1 attribute if a join condition in the WHERE clause is satisfied. To perform the join update operation, a single-AMP merge-delete step and a single-AMP merge step are performed. Because the primary index column A3 of target table T3 is set equal (indirectly) to a constant value in the WHERE clause, the merge-delete and merge steps can all be performed on a single AMP.

Figure 3B:
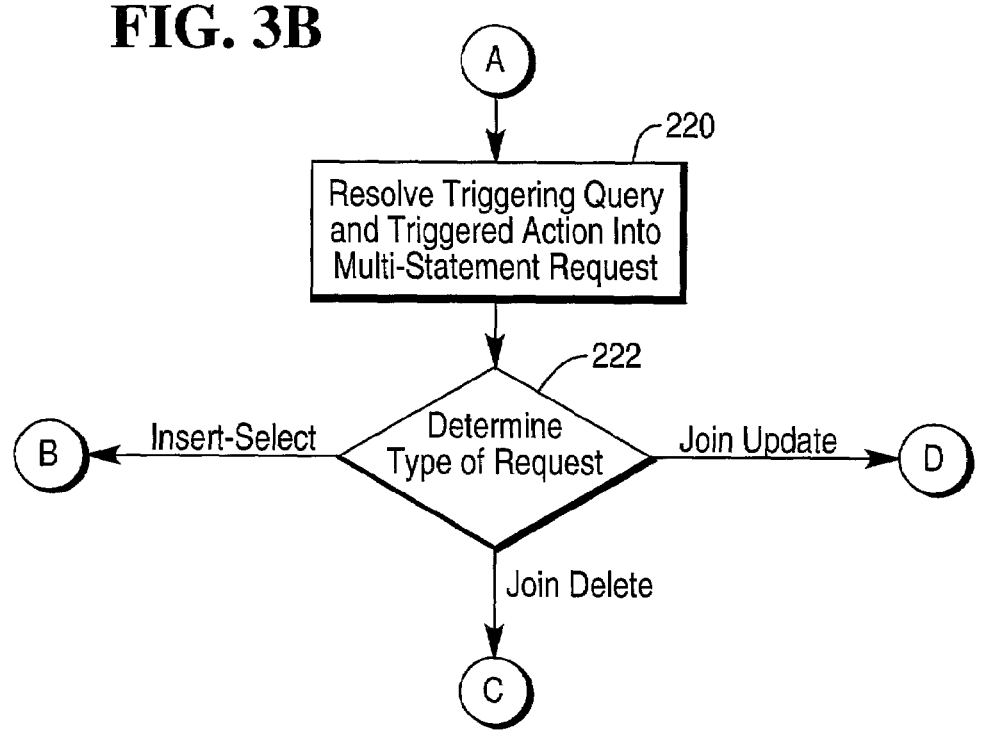
FIGS. 3A–3B are a flow diagram of processing certain types of requests, in accordance with one embodiment, for execution in the parallel database system of FIG. 1.
Figure 3A:
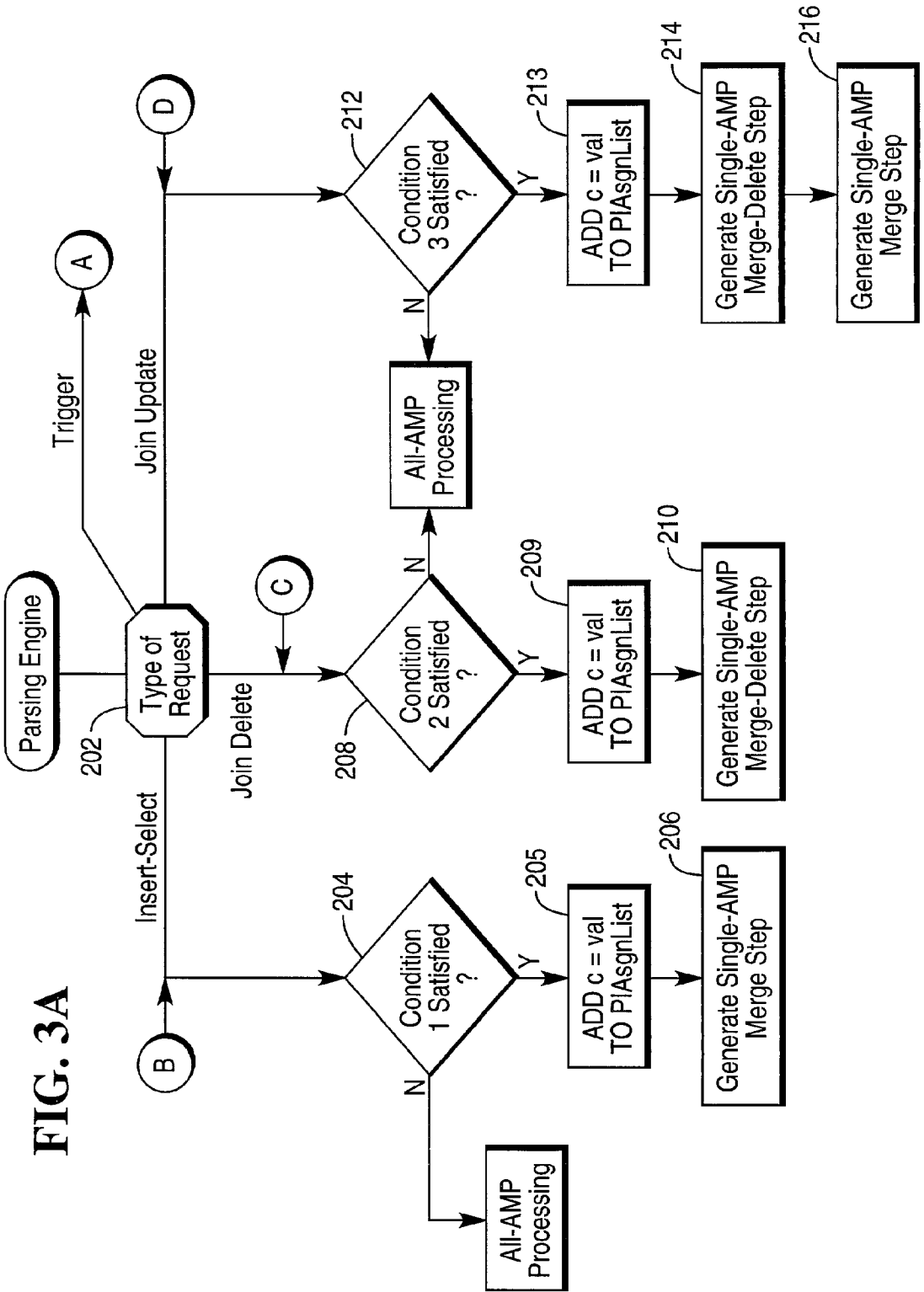

As shown in FIGS. 3A–3B, processing of a request by the parsing engine 20 is shown. Upon receiving a request, the parsing engine 20 determines (at 202) the type of request. For purposes of this discussion, the only requests that are addressed are those that specify insert-select operations, join-delete operations, or join-update operations. Such a request can be an SQL query or a combination of a trigger and a query that when executed causes activation of the trigger (referred to hereinafter as a "combination of a trigger and a triggering query"). If a query specifying an insert-select operation (e.g., INSERT Tx SELECT * FROM Ty WHERE . . . , is received, then the parsing engine 20 determines (at 204) if the criterion for enabling the performance a single-AMP merge step (the "insert-select single-AMP criterion") is satisfied.

Figure 4:
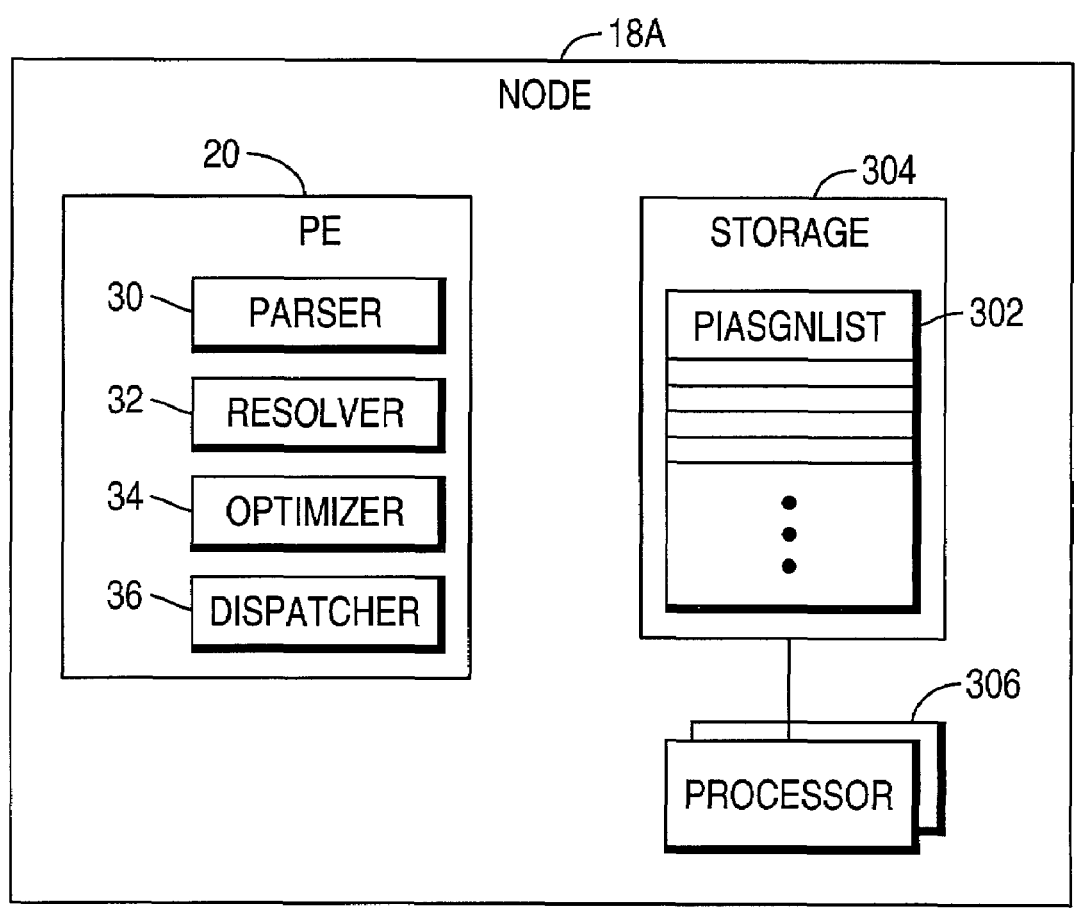
FIG. 4 is a block diagram of components of one of the nodes of the parallel database system of FIG. 1.

If the criterion is evaluated (at 204) to not be satisfied, then the insert-select operation is performed with an all-AMP merge step. However, if the criterion is evaluated (at 204) to be satisfied, then the parsing engine 20 knows the primary index value of the target table. As a result, the parsing engine 20 adds (at 205) c=val (c being the primary index column of the target table and val being a constant derived from the insert-select single-AMP criterion) to a PIAsgnList data structure 302 (FIG. 4). The PIAsgnList data structure 302 is used to indicate whether or not a merge step is to be a single-AMP merge step. Thus, in one example, the parser 30 (FIG. 4) in the parsing engine 20 adds "c=val" to the PIAsgnList data structure 302 (along with an identifier to identify the transaction). The optimizer 34 accesses the PIAsgnList data structure 302 to determine if the merge step can be executed as a single-AMP merge step. The PIAsgnList data structure 302 is stored in a local storage 304 that is accessible by a processor (or processors) 306 in the node 18A. Note, however, that other forms of indicators can be used in other embodiments to indicate a single-AMP step is possible.

Based on the PIAsgnList data structure 302, the parsing engine 20 generates (at 206) a single-AMP merge step. The merge step is communicated to the AMP selected based on the known primary index value. When executed by the AMP, the single-AMP merge step causes selected rows from the source table to be merged into the new rows of the target table. The single-AMP merge step is executed with row-hash locks so that all affected rows of the target table (which in this case are the newly inserted rows) have a row-hash lock placed on each row. A table-level lock on the target table can thus be avoided in this insert-select operation.

If the parsing engine 20 determines (at 202) that the type of the received request is a join-delete query (e.g., DELETE Tx WHERE Ty.Ay=Tx.Ax . . . ), then the parsing engine 20 determines (at 208) if the join-delete single-AMP criterion is satisfied.

If the criterion is determined (at 208) not to be satisfied, then an all-AMP merge-delete step is generated. However, if the criterion is determined (at 208) to be satisfied, the parsing engine 20 adds (at 209) a "c=val" entry (c being the primary index column of the target table) to the PIAsgnList data structure 302. Based on this entry in PIAsgnList, the parsing engine 20 generates (at 210) a single-AMP merge-delete step with row-hash locks. A merge-delete step involves the deletion of rows of the target table where the merge condition matching attributes of the source and target tables is satisfied. The generated single-AMP merge-delete step is sent to a selected one of the AMPs based on the known primary index value of the target table.

In addition to the join-delete examples provided above, another type of join-delete operation is one that is used for join index maintenance in the database system. A join index is one kept for a materialized view for storing the join result of multiple base tables. An example SQL statement for creating a join index is as follows:
  CREATE JOIN INDEX JI_T1.T2 AS SELECT T1.A1 AS JI_COL1, T1.B1 AS JI_COL2, T2.A2 AS JI_COL3, T2.C2 AS JI_COL4
  FROM T1, T2
  WHERE T1.A1=T2.B2
  PRIMARY INDEX (JI_COL3);

The join index created is named JI_TlT2, with attributes of the join index (JI_COL1, JI_COL2, JI_COL3, JI_COL4) set to certain attributes of base tables T1 and T2. The primary index of the join index is JI_COL3(which is attribute A2 of table T2).

An example join-delete operation for the maintenance of the join index JI_T1T2 in response to a DELETE query on table T2(e.g., DELETE T2 WHERE A2=1) is as follows:
  DELETE JI_T1T2 WHERE
  WHOLE_JI_ROW=(SELECT A1, B1, A2, C2 FROM T1, T2 WHERE A1=B2 AND A2=1);

Note that a SELECT query is embedded in the statement above indicated by parentheticals. The join-delete single-AMP criterion in the join index maintenance context is similar to the insert-select single-AMP criterion. For each column, c, that is a primary index column of the join index, the SELECT list of the embedded SELECT query is checked. A single-AMP merge-delete step is possible if one of the following two conditions is met:
1) if the SELECT list specifies a value (constant number) or a value expression (an expression that evaluates to a constant number), referred to as "val," in the position of column c; and
2) if the SELECT list specifies an expression, col_expr (e.g., a+2, a, etc.), involving attributes of the source table in the position of column c, and the WHERE clause of the embedded SELECT contains an equality condition "$s_i$= $val_i$" for each $s_i$ that is a source table attribute involved in col_expr.

If the parsing engine 20 determines (at 202) that the type of query is a join-update query, then the parsing engine determines (at 212) whether the join-delete single-AMP criterion for performing the join update operation as a single-AMP operation is satisfied. If the criterion is evaluated to be satisfied (at 212), then the parsing engine 20 adds (at 213) a "c=val" entry to the PIAsgnList data structure 302. Based on this entry, the parsing engine 20 generates a single-AMP merge-delete step (at 214). The parsing engine 20 also generates a single-AMP merge step (at 216). The merge-delete step causes rows of the target table that satisfy a merge condition to be deleted. The merge step then merges data taken from the source table into corresponding rows of the target table. The generated steps are communicated from the parsing engine 20 to a selected one of the AMPs based on the known primary index value of the target table.

As noted above, the received request can also involve a trigger. As shown in FIG. 3B, if the parsing engine 20 determines (at 202) that the request involves a trigger, then the parsing engine 20 resolves (at 220) the combination of the triggering statement and the statement in the trigger action body into a multi-statement request where possible. The parsing engine 20 then determines (at 222) if the multi-statement request specifies an insert-select, join-delete, or join-update operation. Operation proceeds according to the acts of FIG. 3A based on the determination.

An example trigger is provided below;
REPLACE TRIGGER TESTTRIG
BEFORE UPDATE ON T1
REFERENCING NEW_TABLE AS NEWTAB
 OLD_TABLE AS OLDTAB
FOR EACH STATEMENT
(INSERT T3 SELECT A1, B1 FROM NEWTAB
);

An example statement that when executed causes activation of the trigger is provided below:
UPDATE T1 SET B1=B1+5 WHERE A1=6;

The name of the trigger that is created is TESTTRIG. The "BEFORE UPDATE ON T1" clause defines the data change statement (UPDATE) whose execution on a specified triggering table (in this case T1) causes activation of the trigger. The data change statement can also include INSERT or DELETE. The "BEFORE" modifier indicates that a trigger is to be performed before updating data in table T1. Alternatively, an "AFTER" modifier indicates that a trigger is to be performed after updating data in table T1.

The REFERENCING clause of the trigger defines an alias (e.g., a name for a new row acted on by the trigger, a name for an old row acted on by the trigger, a name for a new table acted on by the trigger, or a name for an old table acted on by the trigger). In the example above, the new table (NEW_TABLE) is referenced by the alias NEWTAB, while the old table (OLD_TABLE) is referred to as OLDTAB. NEW_TABLE is the spool containing the updated entries of table T1, while OLD_TABLE refers to the spool containing the content of table T1 before the update.

The combination of the triggering statement (UPDATE) and the statement in the trigger action body (INSERT) is resolved to a multi-statement request that specifies an insert-select operation. In the above example, the primary index A3 of the target table T3 is assigned to an explicit value through the expression A1 (an attribute of the source table). The attribute A1 is set to the value 6. Therefore, condition (2) of the insert-select single-AMP criterion is satisfied. Before the update of table T1 is performed, new rows are inserted into table T2 using the content of table T1. A retrieve step is performed to retrieve from table T1 rows that satisfy the condition A1=6. The rows are retrieved into the spool NEWTAB built locally on the AMP based on the target table primary index A3= 6. Next, the following steps are performed in parallel: a single-AMP merge is performed of rows from the spool NEWTAB into table T3; and a single-AMP update of the source table T1 is performed (B1=B1+6) for rows satisfying A1=6.

Another combination of trigger and accompanying triggering statement is provided below:
REPLACE TRIGGER TESTTRIG
AFTER UPDATE ON T1
REFERENCING NEW_TABLE AS NEWTAB
 OLD_TABLE AS OLDTAB
FOR EACH STATEMENT
(UPDATE T3 SET B3=NEWTAB.B1+8 WHERE
 A3=NEWTAB.A1
);
UPDATE T1 SET B1=B1+19 WHERE A1=10;

The trigger above specifies that after an update is performed on table T1, the update specified in the trigger action body is to be performed. The combination of the triggering UPDATE statement and the UPDATE statement in the trigger action body is resolved to a multi-statement request specifying a join-update operation. In this example, the criterion for performing the merge-delete step and merge step as single-AMP steps is satisfied.

A single-AMP update of the content of source table T1 (AMP selected based on A1=10) is first performed, in which rows of table T1 satisfying A1=10 are updated by setting B1=B1+19. Next, a single-AMP merge-delete step is performed in which rows of target table T3 satisfying the merge condition (T3.A3=T1.A1 and T3.A3=10 and T1.A2=10) are deleted.

Next, a spool built locally on the AMP selected by the target table primary index value T3.A3=10 is used to collect updated rows of table T3 (B3=NEWTAB.B1+8). Then a single-AMP merge is performed in which the content of the spool is merged into target table T3.

Another example combination of a trigger and accompanying triggering statement is provided below:
REPLACE TRIGGER TESTTRIG
BEFORE DELETE ON T1
REFERENCING OLD_TABLE AS OLDTAB
FOR EACH STATEMENT
(INSERT T3 SELECT * FROM OLDTAB
);
DELETE T1 WHERE A1=7;

The above example is resolved by the parsing engine 20 to a multi-statement request specifying an insert-select operation in which the target table (T3) primary index (A3) column is set equal to a constant value (A3=7). As a result, the merge step that is invoked can be a single-AMP merge step.

A combination of a triggering statement and a trigger that causes performance of a join-delete operation is provided below:
REPLACE TRIGGER TESTTRIG
BEFORE DELETE ON T1
REFERENCING OLD_TABLE AS OLDTAB
FOR EACH STATEMENT
(DELETE T3 WHERE A3=OLDTAB.A1
);
DELETE T1 WHERE A1=6;

In the join-delete operation, a single-AMP merge-delete step is performed because the primary index of the target table T3 is set equal to an explicit value (A3=6). The merge-delete step deletes each row of table T2 that satisfies the merge condition (A1=A3 and A1=6 and A3=6). A single-AMP delete is then performed of rows of table T1 that satisfy A1=6.

The following example trigger combination causes invocation of a join-update operation in which single-AMP merge-delete and merge steps are performed:
REPLACE TRIGGER TESTTRIG
BEFORE DELETE ON T1
REFERENCING OLD_TABLE AS OLDTAB
FOR EACH STATEMENT
(UPDATE T3 FROM OLDTAB SET B3=OLDTAB.B1
 WHERE A3= OLDTAB.A1
);
DELETE T1 WHERE A1=8;

The following trigger combination causes invocation of an insert-select operation in which a single-AMP merge step is performed. In response to the triggering DELETE statement, the trigger is executed to perform the insert into T3 instead of the delete of table T1.

REPLACE TRIGGER TESTTRIG
    INSTEAD OF DELETE ON T1
    REFERENCING OLD_TABLE AS OLDTAB
    FOR EACH STATEMENT
    (INSERT T3 SELECT * FROM OLDTAB
    );
    DELETE T1 WHERE A1=6;

The following trigger combination causes invocation of a join-delete operation in which a single-AMP merge-delete step is performed.

REPLACE TRIGGER TESTTRIG
    INSTEAD OF DELETE ON T1
    REFERENCING OLD_TABLE AS OLDTAB
    FOR EACH STATEMENT
    (DELETE T3 FROM OLDTAB WHERE A3=OLDTAB.A1
    );
    DELETE T1 WHERE A1=5;

The following trigger combination also causes invocation of a join-update operation in which a single-AMP merge-delete step and a single-AMP merge step are performed.

REPLACE TRIGGER TESTTRIG
    INSTEAD OF DELETEETE ON T1
    REFERENCING OLD_TABLE AS OLDTAB
    FOR EACH STATEMENT
    (UPDATE T3 FROM OLDTAB SET B3=OLDTAB.B1+18 WHERE A3= OLDTAB.A1
    );
    DELETE T1 WHERE A1=10;

With the ability to perform single-AMP steps (merge step and/or merge-delete step) whenever a request (insert-select, join delete, or join update) satisfies a predetermined criterion, database efficiency is enhanced. By using resources of one AMP to perform an operation, resources in other AMPs of the parallel database system are not tied up and thus are available for other operations.

Instructions of the various software routines or modules discussed herein (such as parsing engine 20, AMPs 24, and others) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for use in a computer implemented database system having plural access modules to manage concurrent access of data in respective portions of a storage in the database system, the method comprising:

processing a request invoking an operation that is one of an insert-select operation, join-delete operation, and join-update operation, the operation to modify a target table;

determining if one or more predefined criteria associated with the operation are satisfied;

in response to determining that the one or more predefined criteria are satisfied, further determining a single one of the plural access modules having exclusive control over a portion of the target table to be modified and executing a step to modify the portion of the target table on the single one of the plural access modules; and applying a row-hash level lock instead of a table-level lock in the executing step.

2. The method of claim 1, wherein determining if the one or more predefined criteria are satisfied comprises determining that a primary index of the target table is directly or indirectly assigned to a constant value.

3. The method of claim 1, wherein the request comprises an insert-select request having a select list, and wherein the operation is an insert-select operation that involves a source table and the target table, and wherein determining if the one or more predefined criteria are satisfied comprises checking a position in the select list corresponding to a column, c, that is a primary index column of the target table and determining if at least one of the following two conditions is true: (1) the select list specifies a value or value expression in the position of the column c; and (2) the select list specifies an expression, col_expr, involving one or more columns of the source table in the position of column c, and the WHERE clause contains a conjuncted equality condition of the form si=vali where si is a source table column involved in col_expr and vali is a value or value expression.

4. The method of claim 3, further comprising selecting one of the access modules to perform the step based on the known value of the primary index of the target table.

5. The method of claim 4, further comprising adding an indication to a predefined data structure in response to determining the one or more predefined criteria being satisfied.

6. The method of claim 3, wherein executing the step comprises executing a merge step on the single one of the access modules to merge data of the source table into the target table.

7. The method of claim 1, wherein the operation is a join-delete operation that involves a source table and the target table, and wherein determining if the one or more predefined criteria are satisfied comprises checking, for each column c that is a primary index column of the target table, for a conjuncted equality condition that equates, directly or indirectly, the primary index column of the target table with a value or value expression.

8. The method of claim 7, wherein executing the step comprises executing a merge-delete step on the single one of the access modules to delete one or more rows of the target table based on a merge condition between attributes of the source table and target table being evaluated true.

9. The method of claim 1, wherein the operation is a join-update operation that involves a source table and the target table, and wherein determining if the one or more predefined criteria are satisfied comprises checking, for each column c that is a primary index column of the target table, for a conjuncted equality condition that equates, directly or indirectly, the primary index column of the target table with a value or value expression.

10. The method of claim 9, wherein executing the step comprises executing a merge-delete step on the single one of the access modules to delete one or more rows of the target table based on a merge condition between attributes of the source table and the target table being evaluated true;
the method further comprising executing a merge step on the single one of the access modules to merge data into the target table.

11. The method of claim 1, wherein the request comprises a join index maintenance request having an embedded select query with a select list, wherein the operation is a join-delete operation that involves a source table and a target table that includes the join index, and wherein determining if the one or more predefined criteria are satisfied comprises checking a position in the select list corresponding to a column, c, that is a primary index column of the join index and determining if at least one of the following two conditions is true: 1) if the select list specifies a constant number or a value expression in the position of column c; and 2) if the select list specifies an expression, involving attributes of the source table in the position of column c, and a WHERE clause of the embedded select query contains an equality condition si=vali for each si that is a source table attribute involved in col_expr.

12. An article comprising at least one storage medium containing instructions for use in a computer implemented database system having plural access modules that manage respective portions of data in a storage, the instructions when executed cause the database system to:
process a request invoking an operation that is one of an insert-select operation, join-delete operation, and join update, the operation to modify a target table;
determine if one or more predefined criteria associated with the operation are satisfied;
in response to determining that the one or more predefined criteria are satisfied, further determining a single one the plural access modules having exclusive control over a portion of the target table to be modified and generating a step to modify the portion of the target table on the single one of the plural access modules; and
applying a row-hash level lock instead of a table-level lock in the generated step.

13. The article of claim 12, wherein the instructions when executed cause the database system to determine if the one or more predefined criteria are satisfied based on whether a value of a primary index of the target table can be calculated from the request.

14. The article of claim 12, wherein the instructions when executed cause the database system to generate the step by generating at least one of a merge step and a merge-delete step.

15. The article of claim 14, wherein the instructions when executed cause the database system to determine if the one or more predetermined criteria are satisfied by determining if the request equates, directly or indirectly, a primary index of the target table with a constant value.

16. The article of claim 15, wherein the instructions when executed cause the database system to send the step to the single one of the access modules selected based on the value of the primary index of the target table.

17. A computer implemented database system, comprising:
plural storage modules to store respective portions of a target table;
plural access modules to manage access data in of respective storage modules; and
a controller adapted to determine if one or more predefined criteria are satisfied in response to a request that specifies an operation to modify the target table, the operation selected from the group consisting of an insert-select operation, a join-delete operation, and a join-update operation and in response to determining the one or more predefined criteria are satisfied, the controller adapted to determine a single one the plural access modules having exclusive control over a portion of the target table to be modified and to invoke a step executable one the single one of the plural access modules to modify the portion of the target table applying a row-hash level lock instead of a table-level lock.

18. The database system of claim 17, wherein the controller comprises a parsing engine having a parser and an optimizer.

19. The database system of claim 17, wherein the step is at least one of a merge step and a merge-delete step.

20. An article comprising at least one storage medium containing instructions for use in a computer implemented database system having plural access modules that manage respective portions of data in a storage, the instructions when executed causing the database system to:
process a request specifying one of an insert-select operation and join-delete operation on a target table;
if the request specifies an insert-select operation, perform on a single one of the plural access modules determined to have exclusive control over a portion of the target table to be modified a merge step in the insert-select operation with a row-hash level lock in response to determining that the request directly or indirectly equates a primary index of the target table with a constant value; and
if the request specifies a join-delete operation, perform on a single one of the plural access modules determined to have exclusive control over a portion of the target table to be modified a merge-delete step in the join-delete operation with a row-hash level lock in response to determining that the primary index of the target table is equated, directly or indirectly, with a constant value.

* * * * *

UNITED STATES PATENT AND TRADEMARK OFFICE
CERTIFICATE OF CORRECTION

PATENT NO. : 6,952,692 B1  Page 1 of 1
DATED : October 4, 2005
INVENTOR(S) : Bhattiprolu et al.

It is certified that error appears in the above-identified patent and that said Letters Patent is hereby corrected as shown below:

<u>Column 14,</u>
Line 23, after "executable" delete "one" and insert -- on --.

Signed and Sealed this

Twenty-eighth Day of March, 2006

JON W. DUDAS
*Director of the United States Patent and Trademark Office*